United States Patent [19]
Lakotish

[11] Patent Number: 5,454,940
[45] Date of Patent: Oct. 3, 1995

[54] STATIONARY SWIMMING POOL SKIMMER WITH WATER JET DIRECTING MEANS

[75] Inventor: George Lakotish, 28300 Shiawassee, Farmington Hills, Mich. 48336

[73] Assignee: Lakotish; George A., Warren, Mich.

[21] Appl. No.: 110,137

[22] Filed: Aug. 20, 1993

Related U.S. Application Data

[63] Continuation-in-part of Ser. No. 850,697, Mar. 11, 1992, Pat. No. 5,264,122.

[51] Int. Cl.⁶ .................................................. B01D 35/05
[52] U.S. Cl. ................... 210/169; 210/242.1; 210/416.2; 4/490; 15/1.7
[58] Field of Search ....................... 210/169, 242.1, 210/242.3, 416.2, 923; 15/1.7; 4/490, 496

[56] References Cited

U.S. PATENT DOCUMENTS

| | | | |
|---|---|---|---|
| 3,860,518 | 1/1975 | Henricksen | 210/169 |
| 4,053,412 | 10/1977 | Stix | 210/169 |
| 4,059,526 | 11/1977 | Middelbeek | 210/923 |
| 4,089,074 | 5/1978 | Sermons | 210/169 |
| 4,305,830 | 12/1981 | Shimura | 210/923 |
| 4,451,379 | 5/1984 | Levy | 210/169 |
| 4,746,424 | 5/1988 | Drew | 210/169 |
| 4,889,622 | 12/1989 | Newcombe-Bond | 210/169 |
| 4,994,178 | 2/1991 | Brooks | 210/169 |
| 5,143,605 | 9/1992 | Masciarelli | 210/169 |

OTHER PUBLICATIONS

See attached Pool Sweep® Automatic Pool Cleaners Numbers 1&11 Manual, Arneson Product, Inc. (Dec. 1986).
See attached AquaDroid® Mailer.
See attached Polaris® Vac—Sweep 60 Brochure, Polaris Pool Systems, Inc. (Oct. 1989).
See attached Polaris® Vac—Sweep 180 Brochure, Alopex Industries, Inc. (Jun. 1989).
See attached Arneson Pool Vac® Brochure, Arneson Products, Inc. (1989).
See attached Kreepy Krauly® System Brochure.

*Primary Examiner*—Robert A. Dawson
*Assistant Examiner*—Robert James Popovics
*Attorney, Agent, or Firm*—Brooks & Kushman

[57] ABSTRACT

A pool cleaner and method for removing debris from the surface of a pool. The pool cleaner comprises a body having an open first end, open body sides, and a filtration second end, the body being generally hollow to form a conduit for water and having a water supply member which may be operably connected to a source of pressurized water. The body is supported by support means so that the body does not substantially interfere with the circulation of water through the open first end, the open body sides, or the filtration second end. A filter net is attached to the filtration second end of the body and one or more water jets are operably connected to the body for propelling water substantially toward the filter net to direct debris into the filter net.

19 Claims, 4 Drawing Sheets

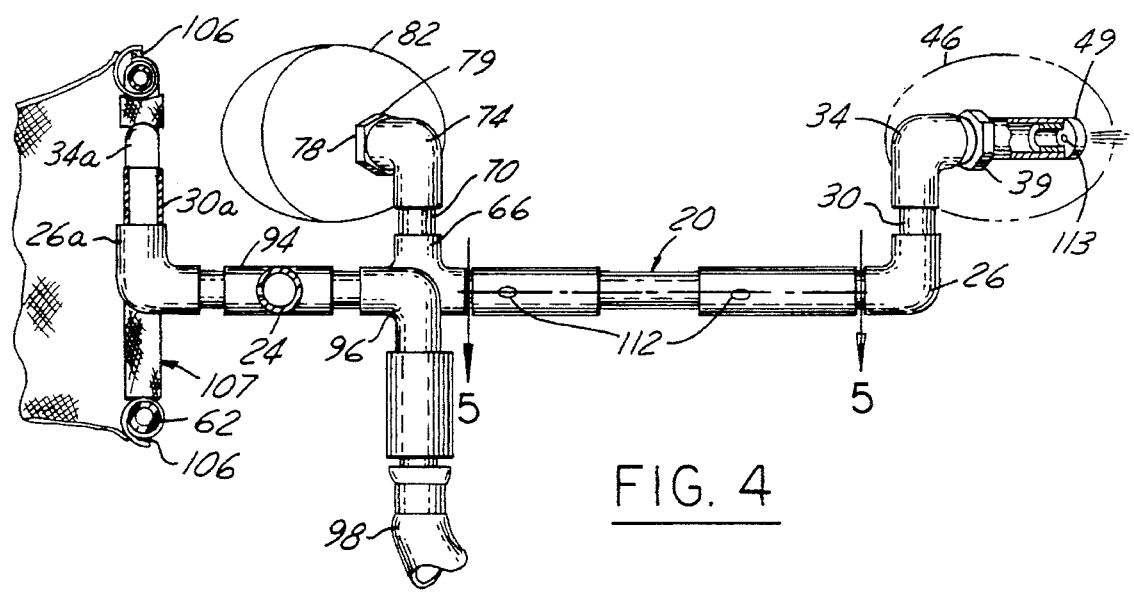
FIG. 4
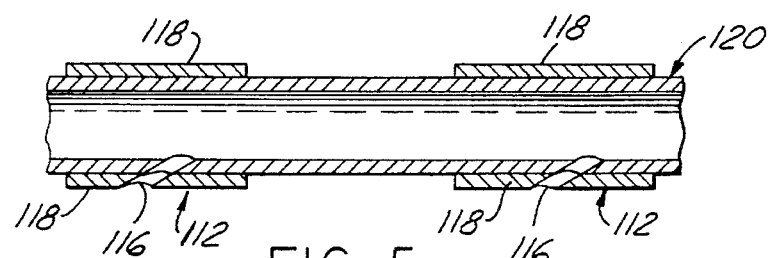
FIG. 5
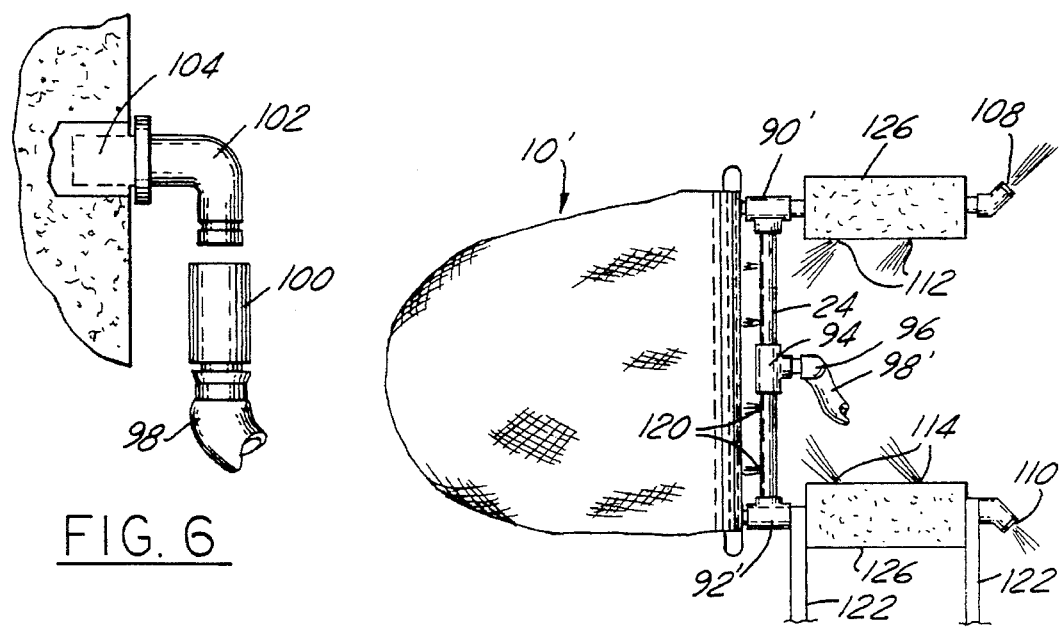
FIG. 6
FIG. 7

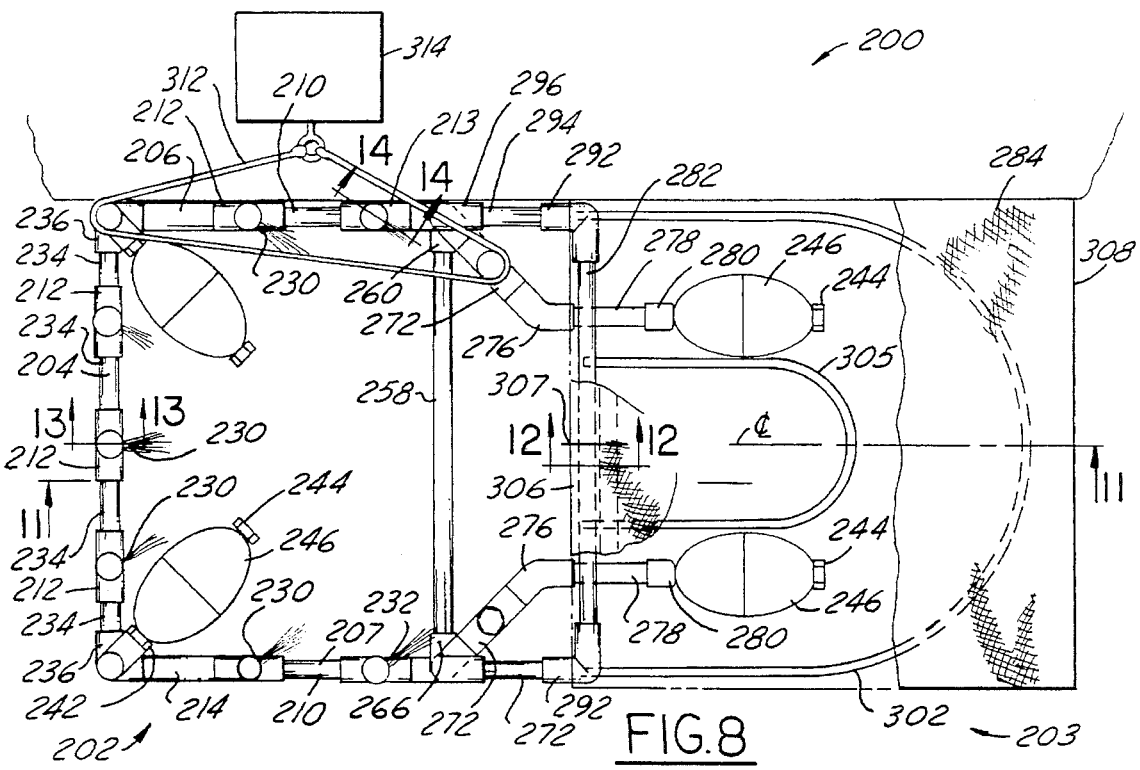
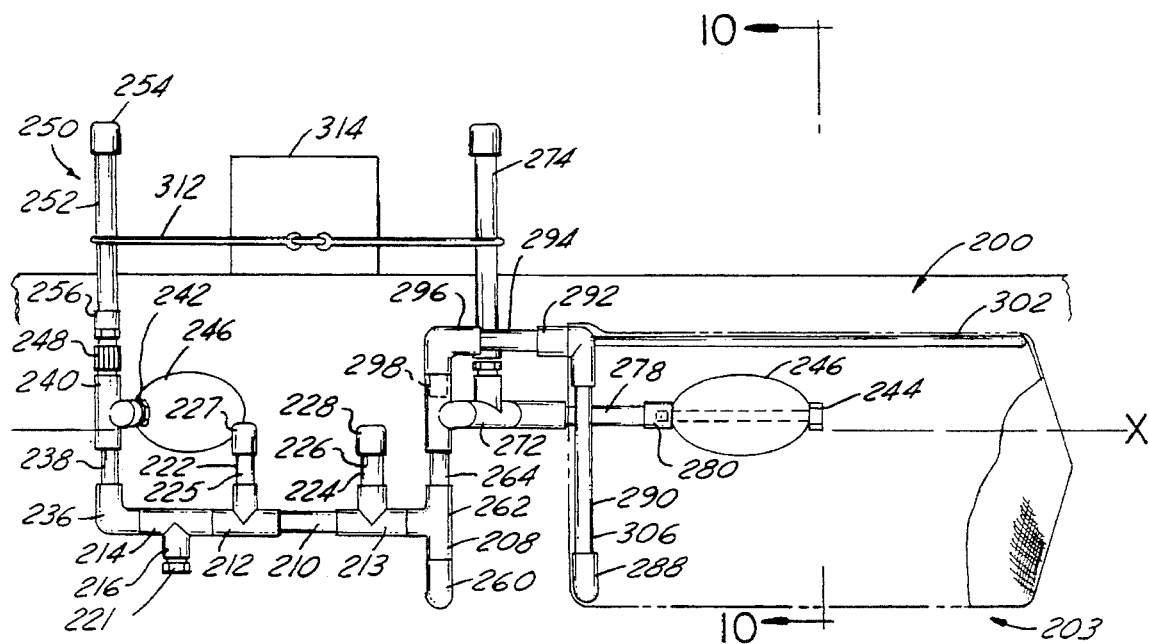
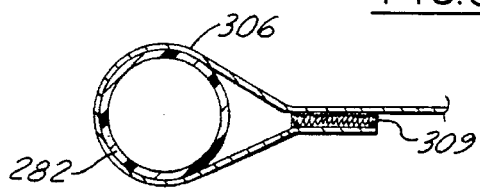
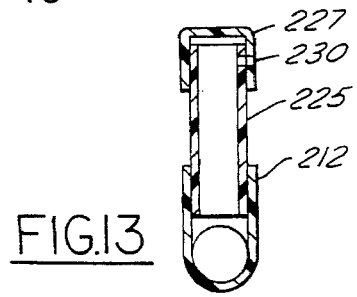

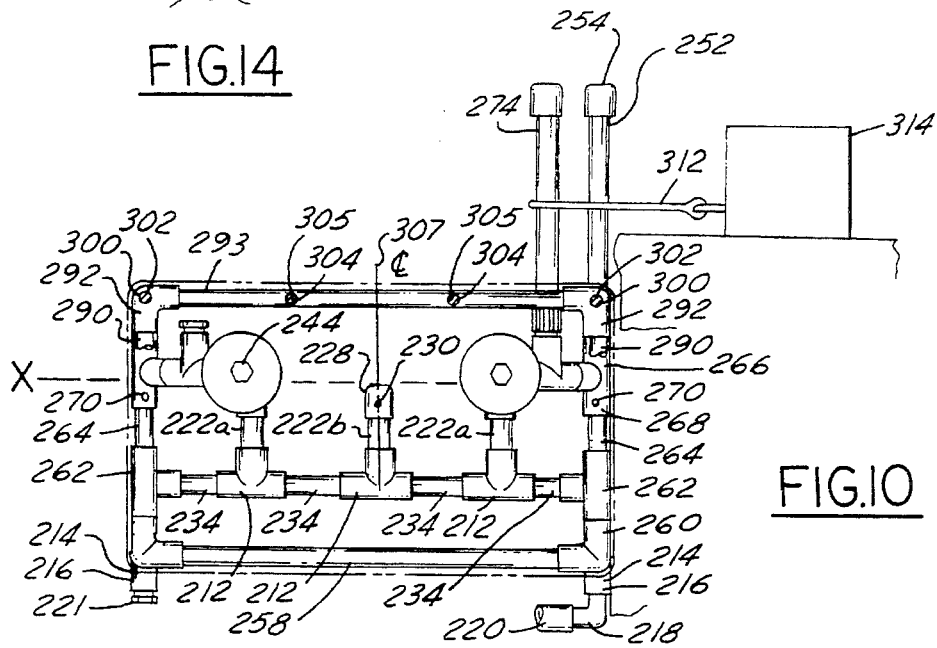
FIG.14
FIG.10
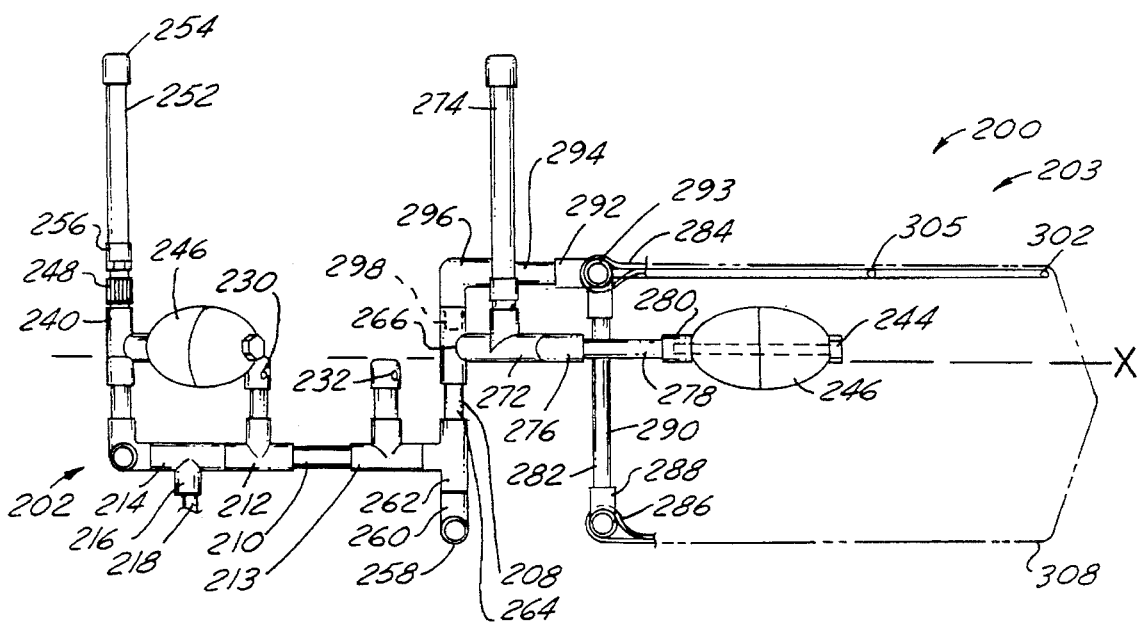
FIG.11

STATIONARY SWIMMING POOL SKIMMER WITH WATER JET DIRECTING MEANS

CROSS-REFERENCE TO RELATED APPLICATION

This application is a continuation-in-part of commonly owned patent application Ser. No. 850,697, filed Mar. 11, 1992, now U.S. Pat. No. 5,264,122, entitled "Stationary Surface Pool Cleaner And Method".

TECHNICAL FIELD

This invention relates to pool cleaners for removing circulating debris from the surface of a pool or the like and a method for doing the same.

BACKGROUND ART

Swimming pools and the like are under constant contamination from foreign matter such as leaves, twigs, bugs, hair, etc. which are introduced into the pool by trees, swimmers, wind, and articles which are used in and around the pool.

The majority of this foreign matter which enters into the pool tends to float on or about the surface of the pool for several hours before becoming water-logged and sinking to the bottom. It has been shown, that because of the foreign matter's tendency to remain at the surface for such an extended period of time, that seventy-five (75%) of pool contaminants are within the top six inches of water.

Traditionally, foreign matter was allowed to sink to the bottom before it was removed by various forms of pool vacuum cleaners or allowed to clog pool skimmers (overflow) as it was drawn into the recirculation system. Examples of pool vacuum cleaners are disclosed in product literature from Polaris® which discloses the VAC SWEEP 180, the KREEPY KRAULY® SYSTEM, Aquanaunt, Inc.'s AQUADROID®, and Arneson Products, Inc.'s POOL VAC®. These devices require the debris to sink to the bottom of the pool before the debris can be removed by vacuuming.

Alternatives to bottom moving vacuum cleaners, are devices which are either stationary or mobile which have at least one water whip which sweeps submerged surfaces of the pool. Examples of such devices are disclosed in U.S. Pat. No. 3,860,518 to Henrickse, issued Jan. 14, 1975, and Arneson Product, Inc.'s POOL SWEEP® I and II. Such devices require a booster pump to increase the water pressure in the pool's recirculation system to drive the water whips, thereby greatly increasing the cost of pool cleaning.

U.S. Pat. No. 4,994,178 to Brooks, issued Feb. 19, 1991, discloses a heavier-than water pool cleaning device which has a floatable body propelled about the surface of the pool by the recirculation system while a water whip having a filter bag attached to its free end travels about the pool floor and walls. This device cleans debris only when it has reached the bottom of the pool.

U.S. Pat. No. 4,746,424 to Drew, issued May 24, 1988, discloses a floating swimming pool cleaner is propelled about the surface of the pool. Debris drawn by suction into the device is either trapped within a basket below the device or withdrawn from the pool through a standard pool vacuum hose. In this configuration, the device may easily become jammed or clogged which may result in serious damage to the pool recirculation system. In addition in this configuration, the device is incapable of trapping larger objects such as twigs which commonly get blown into a pool.

Examples of stationary pool cleaners are disclosed in U.S. Pat. Nos. 4,089,074, issued May 16, 1978 and 4,053,412, issued Oct. 11, 1977, to Sermons and Stix, respectively. These devices are located adjacent the water circulation drain to passively collect debris in the surface flow. These devices do not actively entrap debris by the use of water jets and rely exclusively on the directional surface flow resulting from the recirculation system of the pool.

The present invention incorporates many of the known benefits of pool cleaners while improving on the ease and cost of use and reducing the amount of time necessary to remove debris from the surface flow of a pool.

SUMMARY OF THE INVENTION

An object of the present invention is to provide an improved pool cleaner and method for removing debris from the surface flow of the pool.

Another object of the present invention is to provide a pool cleaner which is relatively inexpensive to produce, use and maintain.

An additional object of the present invention is to provide a pool cleaner which requires little installation or labor costs.

A further object of the present invention is to provide a pool cleaner which enables early, easy removal of surface debris.

Still another object of the present invention is to provide a pool cleaner which propels water to enhance surface flow in a desired direction to actively ingest or redirect surface water to entrap and retain debris from surface flow.

Another object of the present invention is to provide a pool cleaner which can cooperate with normal return pressure of the recirculation system of the pool to actively entrap and retain debris from the surface flow.

A further object of the present invention is to provide a pool cleaner which does not require a booster pump or other such mechanism to clean debris from the surface flow of a pool.

An additional object of the present invention is to provide a pool cleaner which propels water to create a surface and sub-surface circulation causing debris to be entrapped and retained while minimizing any interference with the circulation created by the invention.

A specific object of the present invention is to provide a pool cleaner for removing circulating debris from the surface of a pool or the like. The pool cleaner has a body having an open first end, open body sides, and a filtration second end. The body is generally hollow to form a conduit for water and has a water supply member which may be attached to a pressurized water supply. The body is supported by a support means so that the body will not substantially interfere with the circulation of water through the open first end, open body sides, or the filtration second end. A filter net is attached to the filtration second end of the body and one or more water jets are operably connected to the body for propelling water toward the closed net end to direct debris into the filter net.

In an alternative preferred embodiment, a second water jet is operably connected to the body and propels water substantially along and inside the net sides of the filter net to prevent debris which has been entrapped within the filter net from circulating out of the filter net.

Another specific object of the present invention is to provide a pool cleaning method for removing circulating debris from the surface of a pool or the like. The first step of that method is to support a hollow pool cleaner body so that the pool cleaner body will not substantially interfere with the circulation water through the pool cleaner body. Next, a filter net is attached to the hollow pool cleaner body. Water is then supplied under pressure to the hollow pool cleaner body and that water is jetted from the hollow pool cleaner body toward the filter net to direct debris into the filter net.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 4 is a side view, partially in cross-section of the device taken along line 4—4 of FIG. 2;

FIG. 5 is a fragmentary cross-section of the device taken along line 5—5 of FIG. 4;

FIG. 6 is a fragmentary drawing of the device showing the attachment of the hose to the pool outlet port;

FIG. 7 is a plan view of a similar embodiment showing an alternative flotation arrangement;

FIG. 8 is a plan view of an alternative embodiment of the pool cleaner in accordance with the present invention with a portion of the mesh net cut away to better view the underlying structure;

FIG. 9 is a side view of the alternative embodiment of the pool cleaner shown in FIG. 8 with a portion of the mesh net cut away to better view the underlying structure;

FIG. 10 is an end view of the alternative embodiment taken along the line 10—10 of FIG. 9 and with the bottom portion of the filter net cut away;

FIG. 11 is a cross-sectional side view taken along the line 11—11 of FIG. 8;

FIG. 12 is a fragmentary cross-sectional view taken along line 12—12 of FIG. 8;

FIG. 13 is a fragmentary cross-sectional view taken along line 13—13 of FIG. 8; and FIG. 14 is a fragmentary cross-sectional view taken along line 14—14 of FIG. 8.

BEST MODE FOR CARRYING OUT THE INVENTION

Figure 1:
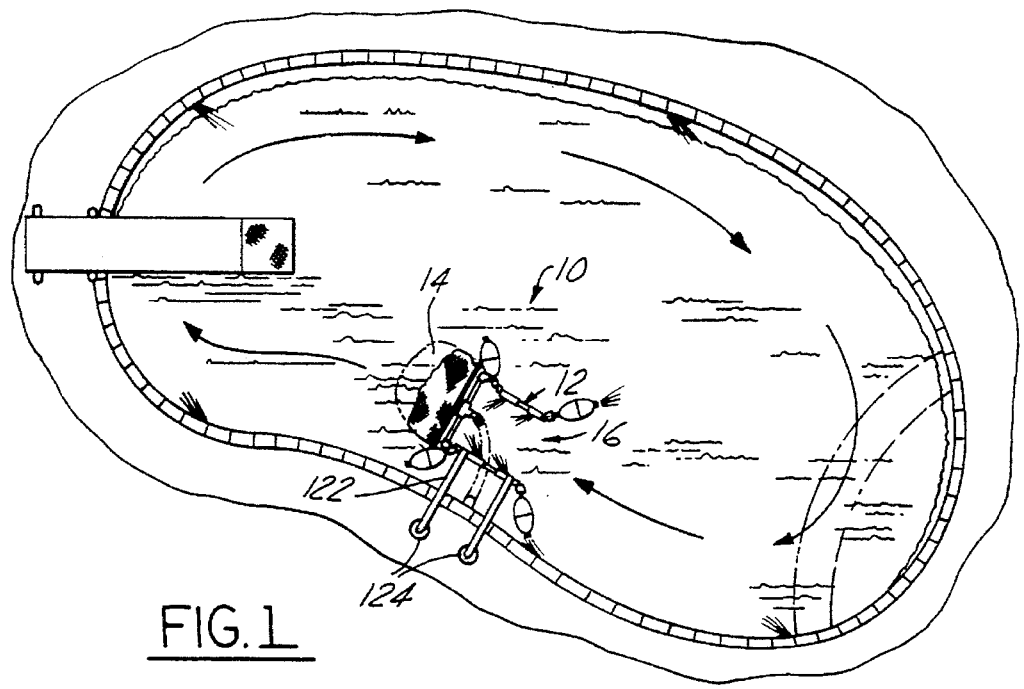
FIG. 1 is a plan view of the pool cleaner in a pool as positioned during use in accordance with one embodiment the present invention.

The preferred embodiment as shown in FIGS. 1–6, illustrates a pool cleaner, generally indicated at 10. The cleaner 10 has a body, generally indicated at 12 and a filter net generally indicated at 14.

The body 12 has a generally scoop-shaped configuration. The scoop-shaped configuration of the body 12 has an open first end 16 and a second end 18. The scoop shape is formed by a first member 20 and a second member 22 which form the sides of the scoop shape. The scoop shape is completed by a third member 24 interposedly connecting the first member 20 and the second member 22.

The first, second and third members, 20, 22 and 24, respectively, are constructed of a hollow ½" PVC tubing such as Jet Stream™ SCH 40 PVC 1120. At the open first end 16 of the first member 20 and the second member 22 are first elbow members 26 and 28 respectively. The elbow members are constructed of hollow PVC such as ½" LASCO™ SCH 40. The first elbow members 26 and 28 are located so as to enable first extension pieces 30 and 32 to be affixed perpendicular to the first elbow members 26 and 28 respectively. The extension pieces are constructed of the same material as the first member. Second elbow members 34 and 36 are rotatably affixed to first extension pieces 30 and 32 respectively so as to allow second extension pieces 38 and 40 to be attached in a plane generally parallel to the first and second members 20 and 22. Interposed between the second elbow members 34 and 36 and the second extension pieces 38 and 40 are first adapter pieces 39 and 41 which allow the second extension pieces 38 and 40 to be of slightly smaller circumference than the first extension pieces 30 and 32. The second elbow members 34 and 36 are rotatable about the first extension pieces 30 and 32 to enable the second elbow members 34 and 36 to be oriented outward from the body 12 at an angle of approximately 45°. Attached to the second extension pieces 38 and 40 respectively are first floats 46 and 48 respectively. An end cap 49 is fitted into the open first end 16 of the first and second members 20 and 22 to retain floats 46 and 48. The floats used in this embodiment, are conventional floats such as those made by LIFEGUARD®.

Figure 3:
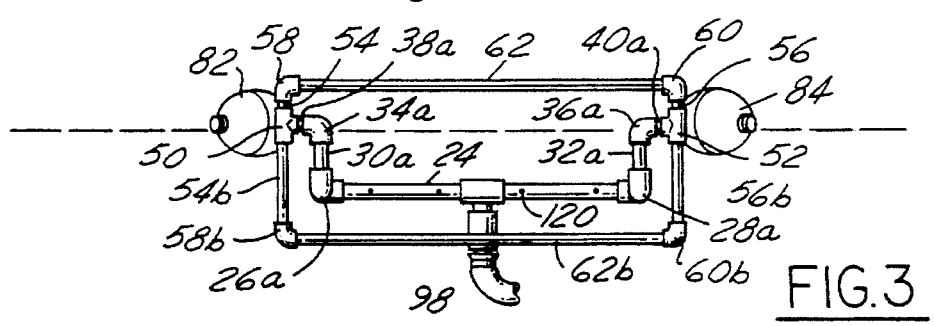
FIG. 3 is an end view of the device taken along line 3—3 of FIG. 2 and with the filter net removed.

As best shown in FIG. 3, located at the second end 18 of the first and second members 20 and 22 is a similar construction to that at the open first end 16 of the first and second members 20 and 22. The same elements appearing at the second end 18 of the first and second members 20 and 22 have corresponding number designations as at the open first end 16 with the addition of an associated letter designation "a" corresponding to the first member 20 and the second member 22 respectively to avoid confusion between the open first end 16 and the second end 18.

With continuing reference to FIG. 3, a major difference between the open first end 16 and the second end 18 is that the second elbow members 34a and 36a are oriented at 90° away from the body 12. Also, the second extension pieces 38a and 40a respectively are attached to first T pieces 50 and 52 respectively. The first T pieces 50 and 52 are affixed so that they are located parallel to first extension pieces 30a and 32a respectively. Third extension pieces 54 and 56 are respectively attached to project upwardly from the first T pieces 50 and 52. Third elbow members 58 and 60 are affixed to the third extension pieces 54 and 56 respectively such that the third elbow members 58 and 60 have an orientation toward the body 12 directly opposite the orientation of second elbow members 34a and 36a. Interposed between the third elbow members 58 and 60 is a fourth member 62. The structure below the first T pieces 50 and 52 is the mirror image of the structure above the first T pieces 50 and 52. The same elements appearing below the first T pieces have the same numeral designation as those elements appearing above the first T pieces 50 and 52. An additional letter designation "b" is utilized to avoid confusion between the structure above the first T pieces 50 and 52 and the structure below the first T pieces 50 and 52.

Referring now to FIG. 4, located along first member 20 and second member 22 are second T pieces 66 and 68 located on the first member 20 and the second member 22 respectively. The second T pieces 66 and 68 are oriented such that fifth extension pieces 70 and 72 located within the second T pieces respectively are perpendicular to the first and second members 20 and 22 respectively. Fourth elbows members 74 and 76 are oriented at approximately 45° outward from the body 12 toward the second end 18. Sixth extension pieces 78 and 80 extend outward from the body 12 and cooperate with second floats 82 and 84. Second adapter pieces 79 and 81 are interposed between the fourth elbow members 74 and 76 and the sixth extension pieces 78 and 80 to enable the sixth extension pieces 78 and 80 to have a slightly smaller circumference to accommodate floats 82 and 84.

Located adjacent the first elbow members 26a and 28a are third T pieces 90 and 92 respectively. The third T pieces are oriented such that they face toward each other to enable third member 24 to be affixed therebetween. Located along third member 24 is a fourth T piece or water supply member 94 which provides water to the body 12. The water supply member 94 is connected to a filter elbow member 96 which cooperates with a first quick release fitting 97 for attaching a hose 98 to the body. As shown in FIG. 6, the hose 98 has a second quick release fitting 100 located at its opposite end for cooperation with an outlet fitting 102. The outlet fitting 102 cooperates with a recirculation outlet 104 of the pool recirculation system. It is water from the pool recirculation system which, in this embodiment, provides water to the pool cleaner 10. In an alternative embodiment, the hose 98 can cooperate with an external water supply such a garden hose to obtain the necessary water for the pool cleaner 10.

The filter net 14 has a mesh configuration which is sufficiently small so as to trap and retain silt and the like. The filter net 14 mesh may be as fine as a nylon stocking, so long as it is capable of trapping silt and debris while being porous to allow surface flow to escape. The invention is not limited to use with a filter net 14 of such fine mesh. It is also capable of use with a filter net of larger mesh if entrapment of only large objects is desired. The filter net 14 is removably affixed to the body 12 by Velcro® 106 affixed to an open net end 107 so as to substantially surround and removably attach the open net end 107 to the fourth members 62 and 62b as well as the third extension pieces 54, 54b and 56, 56b, such that the open net end 107 constantly remains open. The filter net 14 is configured such that the open net end 107 remains open whereas a closed net end 109 is closed to retain debris entrapped within the filter net 14.

A first set of water jets 108 and 110 are located at free ends of the second extension pieces 38 and 40 respectively. The end cap 49 has an aperture 113 which directs water propelled from the body 12. As shown in FIG. 4, the first jets 108 and 110 propel water obtained through the water supply member 94 outward away from the body 12 at an angle of approximately 45°. The water that is propelled from the first jets 108 and 110 extends the scoop-shaped configuration of the body 12 to increase the entrapment of debris. However, only one first jet 108 or 110 is required, and the other first jet 108 or 110 is utilized to increase efficiency of the cleaner 10.

A second set of water jets 112 and 114 are located interposed between the open first end 16 of the body 12 and the second end 18, along the first and second members 20 and 22 respectively. The second jets 112 and 114 propel water back toward the second end 18 at an angle of approximately 45° and propel water upward toward the surface at an angle of 45°. This results in surface ripple to improve movement of debris toward the filter net 14. It also causes some non-surface water and debris to be driven upward into the surface flow resulting in increased cleaning capacity. As shown in FIG. 5, the second jets are formed from apertures 116 located in the first and second members 20 and 22 respectively. A reinforcement 118 surrounds the aperture 116 to thicken the first and second members 20 and 22 respectively to assist in propelling water in the desired direction. The aperture 116 extends through the reinforcement 118 adding to the thickness of PVC tubing through which the water being propelled must travel. This added thickness assists in directing the propelled water at the desired location. In this embodiment, two second water jets 112 and 114 are located on each of the first and second members 20 and 22. However, only one such second jet 112 and 114 is required to perform the task. The additional number of second jets 112 and 114 are used for increased efficiency.

A third set of water jets 120 are located along the fourth member 24 for propelling water into the filter net 14. In this embodiment, four third jets 120 are located along the fourth member 24. The third jets 120 are oriented such that a few jets propel water not only in the same direction as the surface flow but also upward at an angle of approximately 45° to cause water ripple. The result is that debris is retained in the filter net 14 both on and below the surface of the water. It is possible however to entrap and retain debris within the filter net 14 without the use of the third jets 120 or reduce the number thereof. As an alternative to, or in conjunction with the third jets 120, a weir door or gate (not shown) may be used to retain debris trapped within the filter net 14. The weir door is a one-way pivot door which allows surface flow and debris to enter into the filter net 14, but prevents the debris from backing out of the filter net if the recirculation system of the pool is turned off or completed.

As best shown in FIG. 1, restraining straps 122 are affixed to the body 12 to stationarily position the cleaner 10 at the desired location within the pool. In the embodiment shown in FIG. 1, the straps 122 cooperate with a deck weight to secure the straps on the pool deck to position the pool cleaner 10 in the desired location.

As shown in FIG. 7, there is illustrated a different method of floatingly supporting a cleaner 10'. Here, a Styrofoam block 126 is utilized. The block 126 cooperates with the second jets 112' and 114' to allow water to be propelled in the desired direction. The blocks 126 are positioned on the body 12 such that the open net end 107 is positioned partially above the surface and partially below the surface to ensure that debris within the surface flow is entrapped within the cleaner 10.

Figure 2:
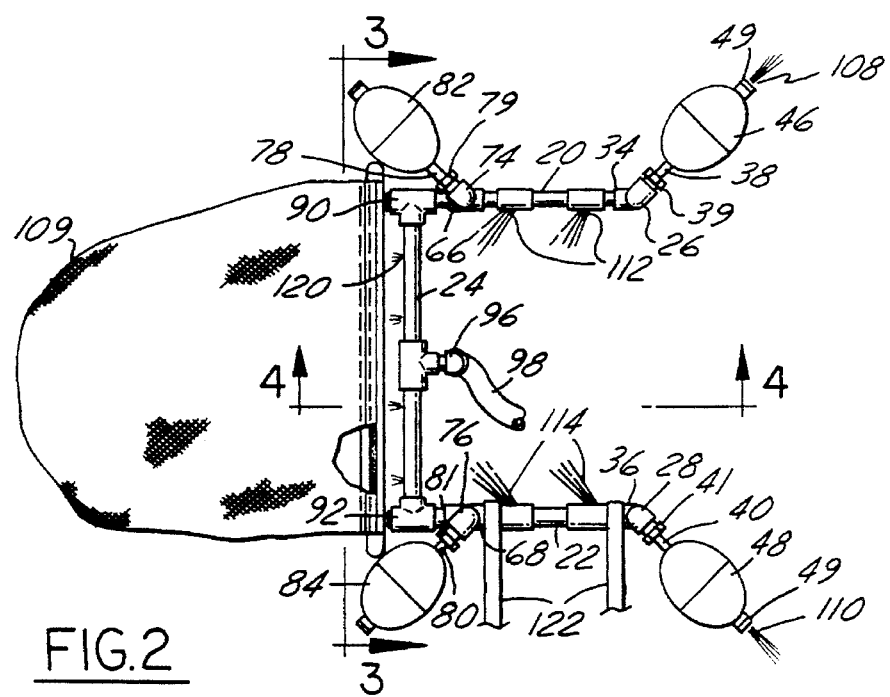
FIG. 2 is an enlarged plan view of the device similar to that shown in FIG. 1, showing the major features of the device as oriented in the pool.

In operation, the recirculation system in a pool, represented in FIG. 1 by directional arrows, causes the water to flow in a uniform direction about the pool. The pool cleaner 10 is placed within the pool so as to receive the surface flow of water. As shown in FIGS. 2 and 3, the floats 46, 48 and 82, 84 are positioned on the body 12 to ensure that the open net end 107 is situated partially above and partially below the surface X of the water. This positioning is accomplished by the length of the first extension pieces 30, 30a and 32, 32a, which determine the height of the floats 46, 48, 82 and 84 are above the body 12. The outlet fitting 102 is attached to one of the outlet ports 104. The hose 98 is attached to outlet fitting 102 by means of the second quick release fitting 100. The other end of the hose 98 is attached to the water supply member 94 by the first quick release fitting 97. Water then travels from the outlet port 104 through the hose 98, the water supply member 94 into the hollow body 12. In an alternative embodiment, water may be supplied from an external water source such as a garden hose.

The water within the body 12 is propelled in the desired directions by the first, second and third water jets, 108, 110, 112, 114, and 120 respectively. The water jets 108, 110, 112, 114, and 120, in combination with the recirculation system of the pool result in debris being entrapped from the surface water and retained within the filter net 14 which filters even the smallest particles of silt and debris from the surface flow.

FIGS. 8–13 show an alternative preferred embodiment of a pool cleaner generally indicated at 200. The cleaner 200 has a body, generally indicated at 202, and a filter net, generally indicated at 203.

As shown in FIGS. 8–11, the body 202 has an open first end 204, two open body sides 206 and 207, and a filtration second end 208.

Each open body side, 206 and 207, is formed by a first conduit member 210 connected at one end to a forward jet T-member 212 and at the other to a rear jet T-member 213, each having the stem of the T oriented upwardly. The forward jet T-member 212 is in turn connected to supply T-member 214 having a water supply member comprising a threaded stem 216 oriented downwardly.

As shown in FIGS. 10 and 11, it is through the threaded stem 216 of the supply T-member 214 that water is supplied to the body 202. The threaded stem 216 cooperates with a threaded fitting 218 for attaching a hose 220 to the body 202. Alternatively, and as explained regarding the first embodiment, the threaded stem 216 may cooperate with a first quick release fitting for attaching the hose 220 to the body 202. In either event the hose 220 may be attached to the pool recirculation system as already explained regarding the first embodiment and as depicted in Figure. In this alternative embodiment, the hose 220 replaces the hose 98 of the first embodiment explained. Alternatively, the hose 220 can cooperate with an external water supply such as a garden hose to obtain the water necessary to operate the cleaner 200.

While the hose 220 is connected to the threaded stem 216 on one side, open body side 206 is shown, for example, the threaded stem 216 on the other open body side 207 must be stopped with a threaded plug 221 to prevent water from exiting. If it is desired to connect the hose 220 to the threaded stem 216 on open body side 207 then the threaded stem 216 on open body side 206 must likewise be stopped with the threaded plug 221.

As best seen in FIGS. 9 and 11, extending upwardly and vertically from each forward jet T-member 212 is a first water jet riser 222. Extending upwardly and vertically from each rear jet T-member 212 is a similar second water jet riser 224.

Each water jet riser 222 and 224 comprises a water jet conduit member 225 and 226, respectively, with jet end caps 227 and 228, respectively, fitted onto the end of each jet conduit member. As shown in FIG. 13, the first water jet riser 222 has a jet aperture 230 oriented substantially horizontally, which includes a slight upward angle, through both the jet end cap 227 and the underlying jet conduit member 225, thus providing a double thickness of material through which the water being propelled must travel. As shown in FIG. 14, the second water jet riser has first angled jet apertures 232 angled upwardly at approximately 40 to 70 degrees through both the jet end cap 228 and the underlying jet conduit member 226. As shown in FIG. 8 the jet riser 222 and the jet riser 224 are both oriented to propel water back toward the filtration second end 208 at an angle of approximately 45 degrees.

One purpose of the jet risers 222 and 224, and others to be discussed, is to allow a substantial portion of the body 202 to be at a different elevation than the jet end caps, therefore allowing water to freely circulate, with a minimum of interference, through the open first end 204, the open body sides 206 and 207, and the filtration second end 208. While these risers are shown oriented upwardly, they could also be oriented downwardly from portions of the body near or above the surface of the water. Also note that while one jet aperture is shown for each jet riser, a single jet riser could support two or more jet apertures.

As shown in FIGS. 8 and 10, the open first end 204 is formed by four second conduit members 234 linearly connected to three jet T-members 212. While the four second conduit members 234 are shown to be of equal length, they may be of various lengths to vary the operating characteristics of the cleaner 200. Extending upwardly and vertically from each of the three jet T-members 212 are first water jet risers 222a and 222b having a construction identical to that already explained for water jet riser 222. The two outermost jet risers 222a have the jet apertures 230 oriented substantially horizontally, which includes a slight upward angle, and oriented to propel water back toward the filtration second end 208 at an angle of approximately 30 degrees while the centermost jet riser 222b has the jet aperture 230 oriented substantially horizontally, which includes a slight upward angle, and oriented to propel water directly back toward the filtration second end 208.

The open first end 204 is connected to the open body sides 206 and 207 by a body three-way elbow member 236. To the upstanding stem of the body three-way elbow member 236 is attached a third conduit member 238 to which is attached a float T-member 240 having a stem oriented horizontally and back toward the filtration second end 208 at an angle of approximately 45°.

Adaptor pieces 242 are attached to the stem of the float T-member 240. These adaptor pieces 242 are threaded to receive the threaded portion of a plastic float bolt 244, which has a smaller diameter than the diameter of the float T-member 240. A support means comprising a float 246 is attached to the stem of the float T-member 240 by screwing the plastic float bolt 244 into the stem of the float T-member 240 after the plastic float bolt 244 has been inserted through the float 246. While any suitable floats may be used, the floats used in this embodiment are those made by LIFEGUARD®. Like the alternative discussed regarding the first embodiment, styrofoam blocks may also be utilized as floats.

The floats 246 described in this embodiment comprise the support means by which the body 202 is supported. However, such support means could also comprise fixably attaching the body 202 to the pool edge through the use of anchor bolts, straps, or any other equivalent structure. Furthermore, if the body 202 is formed of a floatable material, the body 202 itself would comprise the support means without the necessity of any floats 246.

Connected to the upstanding portion of the float T-member 240 is a conduit adaptor 248 having a threaded inner portion. Depending on the orientation of the pool cleaner 200 within a swimming pool, a threaded plug 221 or a first edge stop 250 may be threaded into the conduit adaptor 248. The first edge stop 250 comprises a fourth conduit member 252 having a solid cap 254 at the top and a threaded conduit member 256 at the bottom. The solid cap 254 may be identical to the jet end caps 228, but without jet apertures. The threaded conduit member 256 of the first edge stop 250 is threaded into the float T-member 240 on the open body side, 206 or 207, closest to the edge of the pool. As shown in FIGS. 8, 10 and 11, the first edge stop 250 has been engaged on the open body side 206 adjacent the edge of the pool.

The filtration second end 208 of the body 202 comprises a fifth conduit member 258 connected at the ends to first 90° elbow members 260. The upstanding legs of first 90° elbow members 260 are connected to the conduit T-members 262 having the stems oriented perpendicularly to the fifth conduit member 258. The stems of the conduit jet T-members 262 are connected to the rear jet T-members 213 of the open body sides 206 and 207.

The upstanding portion of the conduit T-member 262 is connected to a sixth conduit member 264 which, in turn, is connected to a retainer jet T-member 266. As can be seen in FIG. 8, the stem of the retainer jet T-member 266 is oriented horizontally and inwardly back away from the open first end 204 at an angle of approximately 40° to 70°.

As shown in FIG. 10, the bottom portions 268 of the retainer jet T-members 266 have second angled jet apertures 270. The sixth conduit member 264 is the structural equivalent of the water jet risers 222 and 224 in that it elevationally separates the second angled jet apertures 270 from the underlying portions of the body 202. These second angled jet apertures 270 are angled upwardly at approximately 40° to 70° through both the bottom part 268 of the retainer jet T-member 266 and the underlying sixth conduit member 264, thus providing a double thickness of material through which the water being propelled must travel. In a horizontal plane, the second angled jet aperture 270 is oriented to propel water back toward the filtration second end 208 at an angle approximately 20° to 30°. If desired, and in order to prevent water from circulating to the remainder of the filtration second end 208 of the body 202, the bottom part 268 of the retainer jet T-member 266 may be stopped or closed off above the second angled jet aperture 270. This may be done in any appropriate manner such as by cementing in place a plastic stop disk 271 (not shown).

The stem portion of the retainer jet T-member 266 is connected to an edge stop T-member 272 having a threaded stem. A threaded plug 221 or a second edge stop 274 may be screwed into the threaded stem of the edge stop T-member 272, depending upon the orientation of the pool cleaner 200. The construction of the second edge stop 274 is identical to the first edge stop 250 excepting that it is slightly longer so that the tops of both the first and second edge stops, 250 and 274, respectively, are approximately equal in height when screwed into the body 202. As shown in FIGS. 9, 10 and 11, similar to the first edge stop 250, the second edge stop 274 has been screwed into the retainer jet T-member 262 on the open body side 206 of the pool cleaner 200 adjacent the edge of the pool.

The filtration second end 208 of the body 202 further comprises a 45° elbow member 276 oriented in a horizontal plane and attached to the edge stop T-member 272. The 45° elbow member 276 in turn is connected to a seventh conduit member 278 which is capped by a threaded end cap 280. The threaded end cap 280 may be the same type of end cap as the jet end caps 228 or the solid cap 254 except that the end of the threaded end cap 280 is coaxially threaded to engage a plastic float bolt 244. The plastic float bolts 244 are inserted first through floats 246 before being screwed into the threaded end caps 280.

As shown in FIGS. 8, 9 and 11, the filter net 203 comprises a filter support structure 282 and a mesh net 284.

The filter support structure comprises an eighth conduit member 286 connected at each end to second 90° elbow members 288 oriented vertically and upwardly at each end. Ninth conduit members 290 are connected to the upstanding legs of the second 90° elbow members 288 at one end and to filter net three-way elbow members 292 at the other end. The filter net three-way elbow members 292 are in turn interconnected by a tenth conduit member 293.

The eighth conduit member 286, the second 90° elbow members 288, the ninth conduit member 290, the filter net three-way elbow members 292 and the tenth conduit member 293 together form a rectangle. The remaining leg of the filter net three-way elbow member 292 projects horizontally toward the open first end 204 of the pool cleaner 200.

Eleventh conduit members 294 are connected to the remaining leg of the filter net three-way elbow member 292 at one end and to third 90° elbow members 296 at the other end. The free leg of the third 90° elbow member 296 is oriented downwardly and, as shown in FIG. 11, connected to a slide conduit member 298.

As shown in FIG. 10, the rear portion of the filter net three-way elbow member 292 has first filter support aperture 300. A first net support rod 302 is bent and each end is inserted into first filter support apertures 300 to form a semi-circular support structure.

The tenth conduit member 293 likewise has second filter support apertures 304 into which the ends of a second net support rod 305 are inserted after being bent. The first and second net support rods 302 and 305 may comprise 5/16 diameter bicarbonate rod or any other material suitable to provide support to the mesh net 284.

Note that while the filter support structure 284 is described as being formed from PVC conduit-type material, the filter support structure 284 does not conduct water and can be formed of any suitable solid material.

Similar to the filter net 14 of the first embodiment, the mesh net 284 is a mesh configuration sufficiently small to trap and retain silt and the like. The mesh net 284 mesh may be as fine as a nylon stocking, so long as it is capable of trapping silt and debris while being porous to allow surface flow to escape. Larger mesh may be used if it is desired to entrap only larger objects.

The mesh net 284 has an open net end 306 having a net center line 307 and a closed net end 308. As shown in FIG. 12, the open net end 306 is removably affixed to the filter support structure 282 by Velcro® 309 affixed to the perimeter of the open net end 306 such that the perimeter of the open net end 306 substantially surrounds and removably attaches to the eighth, ninth and tenth conduit members 286, 290 and 293. The closed net end 308 may be openable if desired via a zipper or Velcro® fastener to ease cleaning of the mesh net 284.

While the mesh net 284 as shown has a top enclosure 310, this is not required. Instead, the mesh net 284 may comprise an open-top weir-like structure. However, a top enclosure 310 is desirable to prevent debris from blowing out of the mesh net 284. In any event, the top enclosure 310 need not be of mesh material as shown. As long as the mesh net 284 comprises mesh material beneath the surface of the water, the pool cleaner 200 will operate.

The filter net 203 may be attached to the body 202 by slidably engaging the slide conduit members 298 into the upstanding portion of the retainer jet T-member 262 of the body 202. Thus, the filter net 203 may be cleaned in one of two ways. First, the filter net 203 may be removed for such cleaning by sliding the slide conduit members 298 out of the upstanding portion of the retainer jet T-member in 212 at the body 202. The mesh net 284 itself may be removed from the filter support structure 282 by unfastening the Velcro® 309.

To retain the pool cleaner 200 in a position adjacent to the edge of a pool, a retaining means is used. In the embodiment shown, the retaining means comprises a rope or strap 312 loosely tied or wrapped around the first and second edge stops 250 and 274 of the body 202 and tied at the other end to a deck weight 314 set on the edge of the pool. While only one such strap 312 and deck weight 314 are shown, two straps may also be used as shown in FIG. 1 regarding the first embodiment, or more if necessary. Furthermore, while the deck weight 314 is shown to have a block shape, it could alternatively comprise a decorative weight set at the edge of the pool or any suitable structure affixed temporarily or permanently to the pool edge such as mating strips of Velcro® or an anchor bolt.

Similar to the first embodiment described, all of the body 200 and the filter support structure 282, excepting the plastic float bolts 244, the floats 246, the first net support rod 302 and the second net support rod 304, may be formed of ½" SCH 40 PVC tubing and other appropriate members connectable to ½" PVC tubing or adjacent members. Such products are made by Jet Stream™, LASCO™ or Spears®.

In operation, and similar to the first embodiment, the pool cleaner 200 is placed within the pool so as to receive the surface flow of water created by the pool recirculation system. The first and second edge stops 250 and 274 in conjunction with the strap 312 and deck weight 314 will maintain the pool cleaner 200 in the correct position even if the water level rises or lowers a number of inches.

As shown in FIGS. 9, 10 and 11, the floats 246 are positioned on a body 202 to ensure that the open net end 306 is situated partially above and partially below the surface X of the water. The hose 220 is attached to a supply means, such as the pool recirculation system or garden hose, at one end while the other end is connected to the supply T-member 214 of the body 202 as already explained. In this manner, water is supplied to the body 202 of the pool cleaner.

The water within the body 202 is propelled in the desired directions by the first water jet risers 222, 222a and 222b, the second water jet risers 224, and the retainer jet T-member 266. The water jets emanating from the first water jet risers 222, 222a and 222b and the second water jet risers 224 create an overall circulation of some depth resulting in debris being entrapped from the surface water and retained within the mesh net 284. In an alternate preferred embodiment, the first water jet risers 222, 222a and 222b and the second water jet risers 224 are oriented to propel water in directions approximately converging at the net center line 307. The second water jet riser 224 also creates a ripple effect in the surface, toward the mesh net 284, thereby facilitating the entrapment of debris. The water jetted from the retainer jet T-member 266 also creates a surface ripple and prevents water currents from carrying debris out of the mesh net 284 at the peripheral edges or net sides of the mesh net 284. As an alternative, a weir door or gate (not shown) may be used to retain debris trapped within the mesh net 284.

While the best modes for carrying out the invention have been described in detail, those familiar with the art to which this invention relates will recognize various alternative designs and embodiments for practicing the invention as defined by the following claims.

What is claimed is:

1. A pool cleaner for removing circulating debris from the surface of a pool, said pool cleaner comprising:

a support means;

a body having an open first end, open body sides, and a filtration second end, said body being generally hollow to form a conduit for water and having a water supply member, said body being supported by said support means such that said body will not substantially interfere with the circulation of water through said open first end, said open body sides or said filtration second end;

a filter net attached to said filtration second end of said body, said filter net having an open net end adjacent said filtration second end, net sides and a closed net end projecting away from said filtration second end; and one or more first water jets connected to said body for propelling water substantially toward said closed net end of said filter net to direct debris into said filter net.

2. The pool cleaner of claim 1 wherein said support means comprises a float.

3. The pool cleaner of claim 1 wherein said pool has a recirculation system and said water supply member of said body is connectable to said recirculation system.

4. The pool cleaner of claim 1 wherein said filter net is removably attachable to said filtration second end of said body such that a portion of said open net end is located above said surface and a remainder of said open net end is located below said surface.

5. The pool cleaner of claim 4 wherein said filter net has a top enclosure.

6. The pool cleaner of claim 1 wherein the body includes one or more first water jet risers connected to said body and supporting said one or more first water jets at an elevational distance from said body to minimize the interference of said body to water circulating, as a result of said one or more first water jets, through said open first end, said open body sides or said filtration second end.

7. The pool cleaner of claim 6 wherein said one or more first water jets propel water substantially parallel to the surface of the water.

8. The pool cleaner of claim 1 wherein said open net end has a net center line and said one or more first water jets propel water in directions approximately converging at said net center line.

9. The pool cleaner of claim 1 further comprising one or more retainer water jets connected to said body for propelling water substantially along and inside said net sides of said filter net to prevent debris which has been entrapped within said filter net from circulating out of said filter net.

10. The pool cleaner of claim 9 wherein said body includes one or more retainer water jet risers connected to said body and supporting said one or more retainer water jets at an elevational distance from said body to minimize the interference of said body to water circulating, as a result of said one or more first water jets or said one or more retainer water jets, through said open first end, said open body sides or said filtration second end.

11. The pool cleaner of claim 10 wherein said one or more retainer water jets propel water substantially upwardly at an approximate angle of 40 to 70 degrees.

12. The pool cleaner of claim 10 wherein the filter net is removably attachable to said filtration second end of said body.

13. The pool cleaner of claim 1 further comprising a retaining means to maintain said body in a substantially stationary orientation within said pool.

14. The pool cleaner of claim 13 wherein said retaining means allows said body to move up or down, depending on the surrounding water level, while maintaining said body in a substantially stationary orientation within said pool.

15. A pool cleaner for removing circulating debris from the surface of a pool, said pool cleaner comprising:

a support means;

a body comprising an open first end having one or more first water jet risers oriented substantially vertically, open body sides having one or more second water jet risers oriented substantially vertically, and a filtration second end having one or more retainer jet risers oriented substantially vertically, said body being generally hollow to form a conduit for water and having a water supply member, said body being supported by said support means such that said body will not substantially interfere with the circulation of water through said open first end, said open body sides or said filtration second end;

a filter net attached to said filtration second end of said body, said filter net having an open net end adjacent said filtration second end, net sides and a closed net end projecting away from said filtration second end; and one or more first water jets connected to said open first end and supported at an elevational difference from said open first end by said one or more first water jet risers, said one or more first water jets oriented substantially horizontally to direct debris into said filter net;

one or more second water jets connected to said open body sides and supported at an elevational difference from said open body sides by said one or more second water jet risers, said one or more second water jets oriented substantially horizontally to direct debris into said filter net;

one or more third water jets connected to said open body sides and supported at an elevational difference from said open body sides by said one or more second water jet risers, said one or more third water jets oriented substantially upwardly to direct debris into said filter net;

one or more retainer water jets connected to said filtration end and supported at an elevational difference from said filtration end by said one or more retainer water jet risers, said one or more retainer water jets oriented substantially upwardly and substantially along and inside said net sides of said filter net to prevent debris which has been entrapped within said filter net from circulating out of said filter net.

16. The pool cleaner of claim 15 wherein said one or more third water jets and said one or more retainer water jets are oriented upwardly at approximately 40 to 70 degrees.

17. The pool cleaner of claim 15 wherein said support means comprises a float.

18. The pool cleaner of claim 15 wherein said pool has a recirculation system and said water supply member of said body is connectable to said recirculation system.

19. The pool cleaner of claim 15 wherein said filter net is removably attachable to said filtration second end of said body such that a portion of said open net end is located above said surface and a remainder of said open net end is located below said surface.

* * * * *